US012561617B2

(12) United States Patent
Nogami

(10) Patent No.:  US 12,561,617 B2
(45) Date of Patent:  Feb. 24, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Atsushi Nogami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 867 days.

(21) Appl. No.: 17/743,568

(22) Filed: May 13, 2022

(65) Prior Publication Data

US 2022/0269996 A1  Aug. 25, 2022

Related U.S. Application Data

(63) Continuation of application No. PCT/JP2020/041754, filed on Nov. 9, 2020.

(30) Foreign Application Priority Data

Nov. 14, 2019  (JP) ................................. 2019-206352

(51) Int. Cl.
*G06N 20/20*  (2019.01)
*A63B 71/06*  (2006.01)
(Continued)

(52) U.S. Cl.
CPC ............. *G06N 20/20* (2019.01); *G06V 10/75* (2022.01); *G06V 10/7788* (2022.01);
(Continued)

(58) Field of Classification Search
CPC .... G06N 20/20; G06N 3/0464; G06N 3/0475; G06N 3/045; G06V 10/75;
(Continued)

(56) References Cited

U.S. PATENT DOCUMENTS 7,480,640 B1   1/2009  Elad et al.
8,368,521 B2   2/2013  Anabuki et al.
(Continued)

FOREIGN PATENT DOCUMENTS

CN      104967885 A      10/2015
CN      108009521 A  *  5/2018  ......... G06F 16/5838
(Continued)

OTHER PUBLICATIONS

Liu et al., ("CN 110147699 A" English Translation 24 pages published Aug. 20, 2019 (Year: 2019).*
(Continued)

*Primary Examiner* — Quoc A Tran
(74) *Attorney, Agent, or Firm* — Venable LLP

(57)  ABSTRACT

An information processing apparatus comprising: a first acquiring unit configured to acquire information about learning data used in learning of each of a plurality of prelearned models for recognizing input data; a second acquiring unit configured to acquire information indicating an attribute of recognition target data; and a model selecting unit configured to select a model to be used in recognition of the recognition target data from the plurality of models, based on a degree of matching between the attribute of the recognition target data and an attribute of the learning data used in learning of each of the plurality of models, and on diversity of the attribute of the learning data used in learning of each of the plurality of models.

9 Claims, 9 Drawing Sheets

(51) Int. Cl.

| | |
|---|---|
| *B26D 5/00* | (2006.01) |
| *B61G 5/04* | (2006.01) |
| *G06F 18/20* | (2023.01) |
| *G06F 18/21* | (2023.01) |
| *G06N 3/045* | (2023.01) |
| *G06N 3/0464* | (2023.01) |
| *G06N 3/0475* | (2023.01) |
| *G06T 7/00* | (2017.01) |
| *G06V 10/70* | (2022.01) |
| *G06V 10/75* | (2022.01) |
| *G06V 10/778* | (2022.01) |
| *G06V 10/94* | (2022.01) |

(52) U.S. Cl.

CPC ...... *G06V 10/87* (2022.01); *A63B 2071/0677* (2013.01); *B26D 5/007* (2013.01); *B60R 2300/30* (2013.01); *B61G 5/04* (2013.01); *G06F 18/2185* (2023.01); *G06F 18/285* (2023.01); *G06N 3/045* (2023.01); *G06N 3/0464* (2023.01); *G06N 3/0475* (2023.01); *G06T 7/0004* (2013.01); *G06T 2207/20081* (2013.01); *G06T 2207/20084* (2013.01); *G06T 2207/30132* (2013.01); *G06T 2207/30184* (2013.01); *G06V 10/945* (2022.01)

(58) Field of Classification Search

CPC .. G06V 10/7788; G06V 10/87; G06V 10/945; G06F 18/2185; G06F 18/285; G06T 2207/20081; G06T 2207/20084; G06T 2207/30132; G06T 2207/30184; G06T 7/0004; A63B 2071/0677; B26D 5/007; B60R 2300/30; B61G 5/04

See application file for complete search history.

(56) References Cited

U.S. PATENT DOCUMENTS

| | | | |
|---|---|---|---|
| 8,841,991 | B2 | 9/2014 | Anabuki et al. |
| 10,867,251 | B2 | 12/2020 | Motohashi |
| 11,295,142 | B2 | 4/2022 | Miyatani et al. |
| 11,308,352 | B2 | 4/2022 | Nogami et al. |
| 2017/0213101 | A1 | 7/2017 | Rubens et al. |
| 2018/0020247 | A1 | 1/2018 | Zhang et al. |
| 2018/0181875 | A1 | 6/2018 | Motohashi et al. |
| 2018/0181885 | A1 | 6/2018 | Higo et al. |
| 2018/0330262 | A1 | 11/2018 | Motohashi |
| 2019/0147292 | A1* | 5/2019 | Watanabe ........... G06F 16/5838 |
| | | | 382/103 |
| 2020/0014761 | A1 | 1/2020 | Kawaai et al. |
| 2020/0019133 | A1 | 1/2020 | Takeuchi |
| 2022/0207290 | A1 | 6/2022 | Nogami et al. |

FOREIGN PATENT DOCUMENTS

| | | | | |
|---|---|---|---|---|
| CN | 108496200 | A | 9/2018 | |
| CN | 110147699 | A * | 8/2019 | ............ G06F 18/24 |
| JP | 2018-106662 | A | 7/2018 | |
| JP | 6474946 | B | 2/2019 | |
| JP | 2019-075159 | A | 5/2019 | |
| JP | 2019-125113 | A | 7/2019 | |
| WO | 2016/067483 | A1 | 9/2017 | |
| WO | 2018/180406 | A | 10/2018 | |
| WO | 2018/173121 | A1 | 12/2019 | |

OTHER PUBLICATIONS

Chen et al., ("CN 108009521 A" English Translation 15 pages published May 8, 2018 (Year: 2018).*

Jan. 29, 2024 Office Action in Japanese Patent Application No. 2019-206352.

International Search Report for International Patent Application No. PCT/JP2020/041754.

Jul. 25, 2023 Extended Search Report in European Patent Application No. 20 887 656.5.

May 15, 2025 Office Action in Chinese Patent Application No. 202080079100.1 (with English translation).

Shen et al., "Heterogeneous Evidence Chains Based Fusion Reasoning for Multi-attribute Group Decision Making," Acta Automatica Sinica, Apr. 2015, pp. 832-842, vol. 41, No. 4, China Academic Journal Electronic Publishing House, China (with machine translation).

Dec. 8, 2025 Office Action in Chinese Patent Application No. 202080079100.1 (with machine translation).

* cited by examiner

F I G. 3
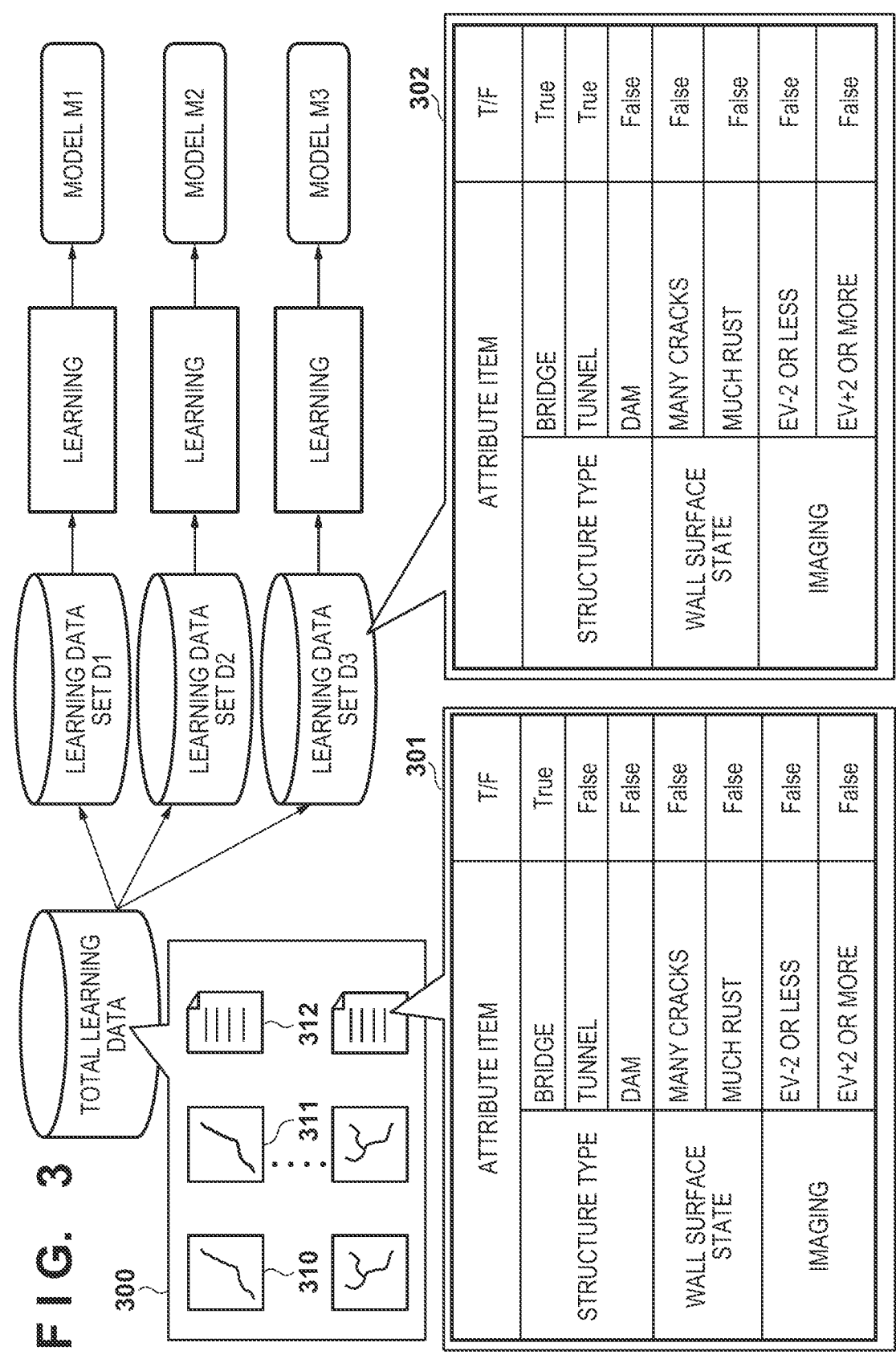

FIG. 4

```
        ( START )
            │
            ▼
┌───────────────────────────────────────┐
│  FORM INFORMATION OF ATTRIBUTE SET OF  │ ~S401
│           RECOGNITION TARGET           │
└───────────────────────────────────────┘
            │
            ▼
┌─┬─────────────────────────────────┬──┐
│ │          SELECT MODEL           │  │ ~S402
└─┴─────────────────────────────────┴──┘
            │
            ▼
┌───────────────────────────────────────┐
│          RECOGNITION PROCESS          │ ~S403
└───────────────────────────────────────┘
            │
            ▼
         ( END )
```

FIG. 5

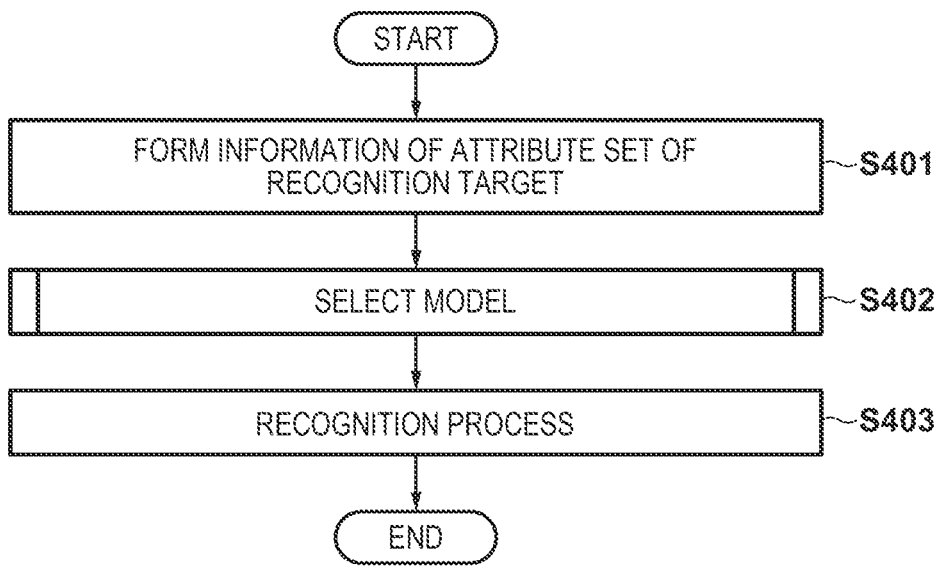

FIG. 7

| ATTRIBUTE ITEM | | RECOGNITION TARGET | MODEL M1 | MODEL M2 | MODEL M3 | MODEL M4 | | MODEL Mn |
|---|---|---|---|---|---|---|---|---|
| STRUCTURE TYPE | BRIDGE | ○ | ○ | ○ | ○ | × | | ○ |
| | TUNNEL | × | × | × | × | ○ | | ○ |
| | DAM | × | × | × | × | × | | ○ |
| WALL SURFACE STATE | MANY CRACKS | ○ | × | ○ | ○ | ○ | | ○ |
| | MUCH RUST | × | × | ○ | ○ | × | | ○ |
| IMAGING | EV-2 OR LESS | ○ | ○ | ○ | ○ | × | | ○ |
| | EV+2 OR MORE | × | × | × | ○ | ○ | | ○ |

F I G.  8
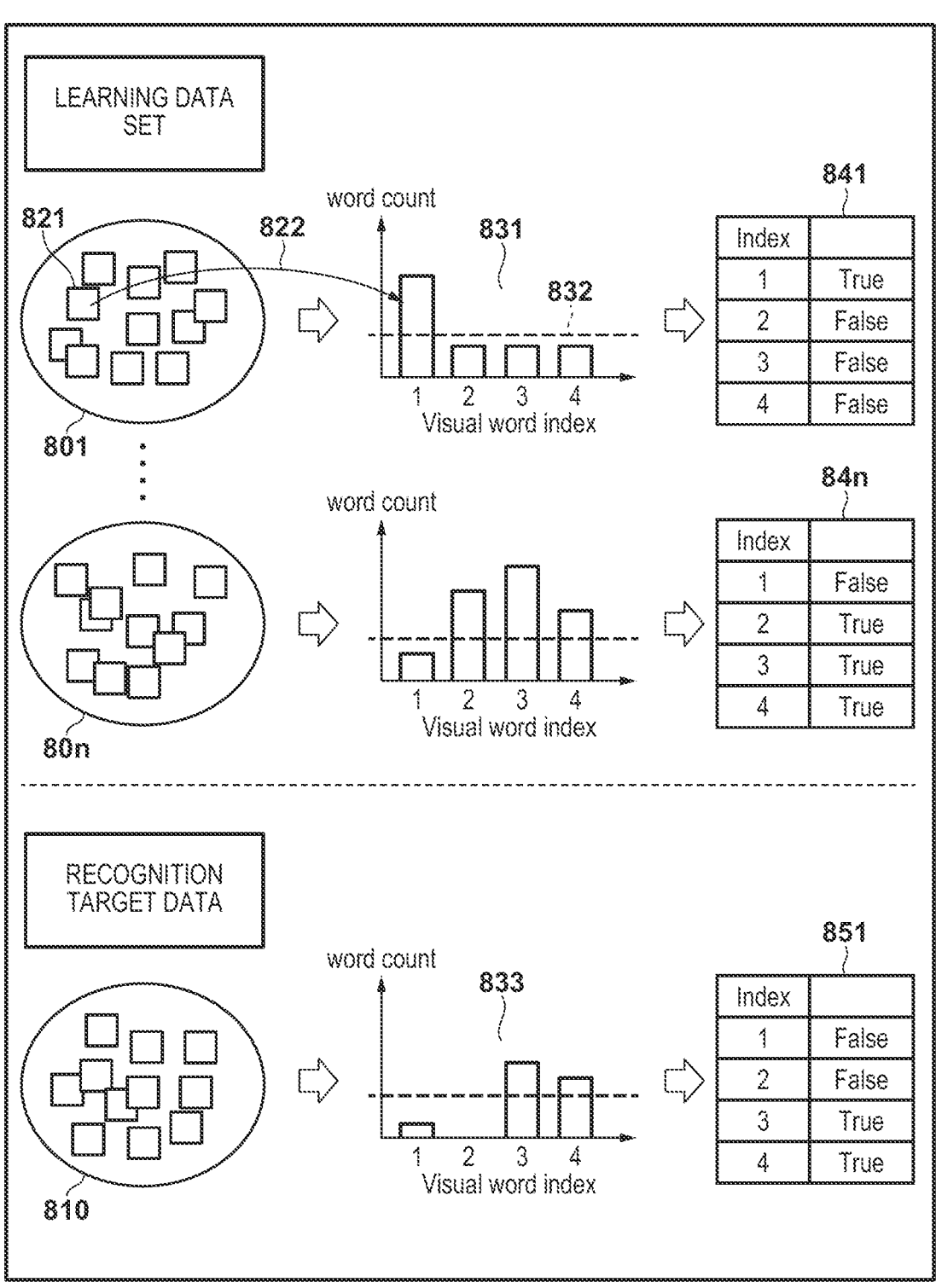

F I G. 10
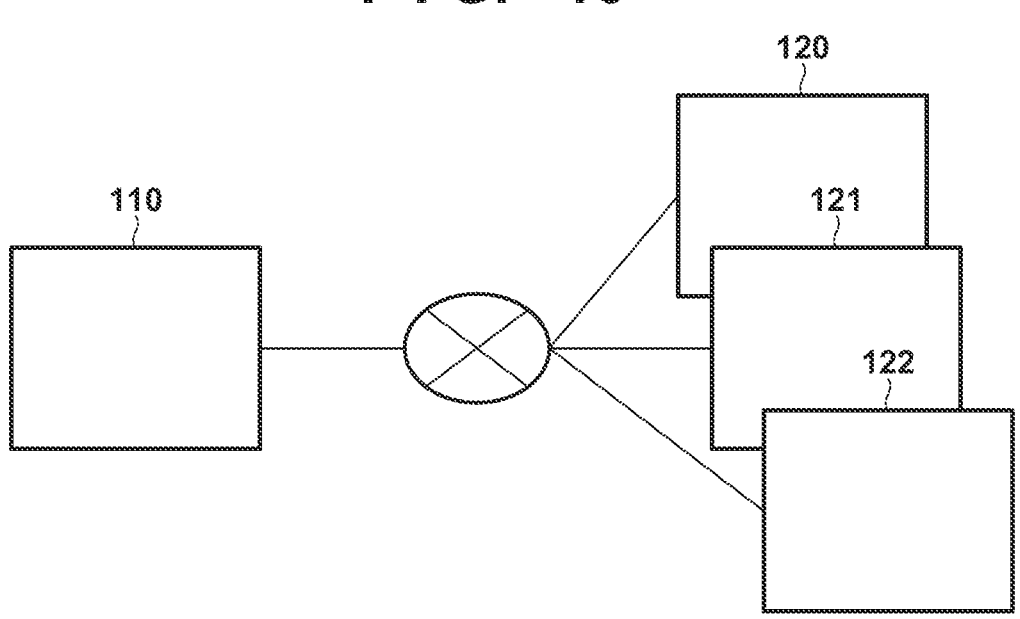
F I G. 11
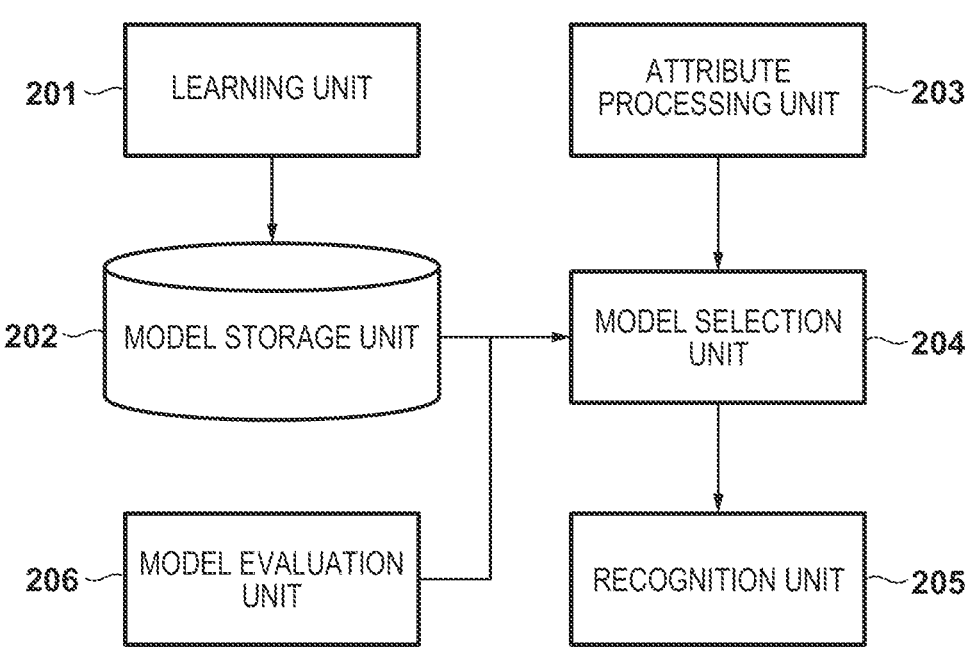

F I G. 12
1200
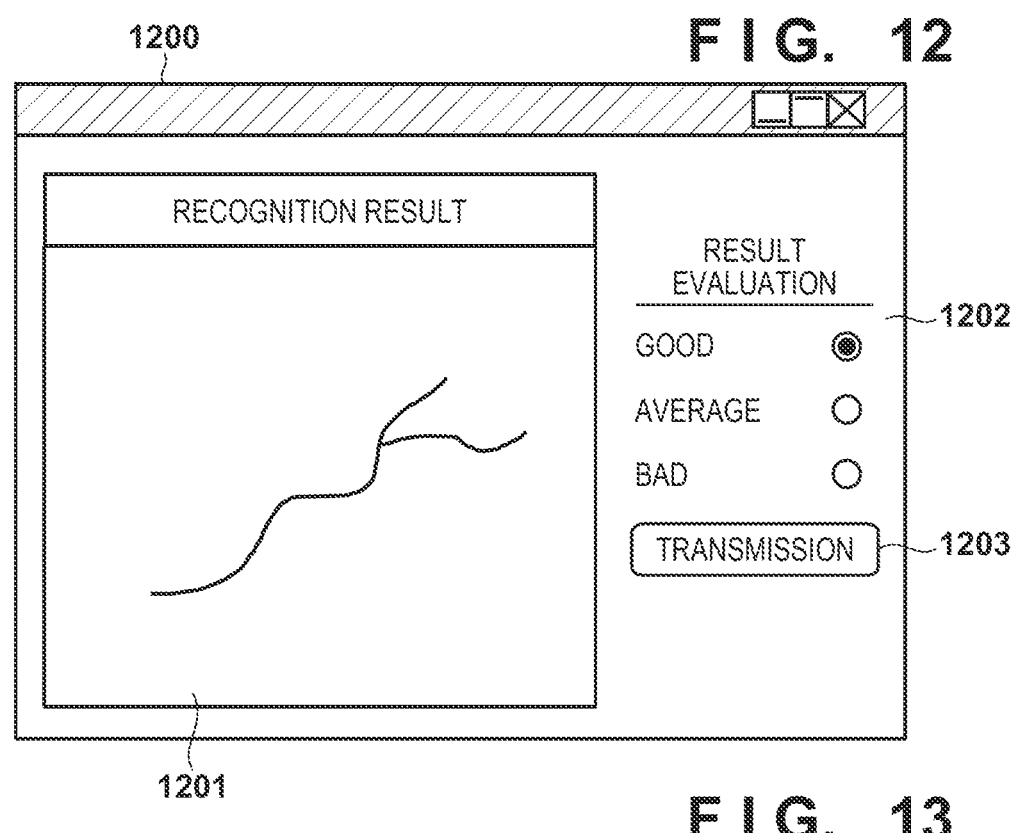
RECOGNITION RESULT
RESULT EVALUATION — 1202
GOOD ⦿
AVERAGE ○
BAD ○
TRANSMISSION — 1203
1201
F I G. 13
PLEASE SET RECOGNITION TARGET DATA ATTRIBUTES
| | | True | False | Void |
|---|---|---|---|---|
| CAMERA INSTALLATION ENVIRONMENT | SHOP | ⦿ | ○ | ○ |
| | STATION | ○ | ⦿ | ○ |
| | ROAD | ○ | ○ | ⦿ |
| RECOGNITION TARGET | PERSON | ○ | ○ | ⦿ |
| | VEHICLE | ○ | ○ | ⦿ |
| IMAGING | EV-2 OR LESS | ○ | ○ | ⦿ |
| | EV+2 OR MORE | ○ | ○ | ⦿ |

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2020/041754, filed Nov. 9, 2020, which claims the benefit of Japanese Patent Application No. 2019-206352, filed Nov. 14, 2019, both of which are hereby incorporated by reference herein in their entirety.

BACKGROUND OF THE INVENTION

Field of the Invention

The present invention relates to an information processing apparatus, an information processing method, and a storage medium, and more particularly, to a technique for selecting a learned model.

Background Art

In machine learning, a learned model is formed by learning of learning data. If the contents of data of learning data sets are different, models having different characteristics are formed. When learning a plurality of models by using a plurality of different learning data sets as described above, an appropriate model must be selected in accordance with a recognition target.

PTL 1 discloses a technique by which a model learned by using an image having imaging conditions similar to imaging conditions including the imaging position and the imaging angle of a recognition target image is selected as a model to be used in recognition.

Also, a model learned by using a learning data set formed by various kinds of data is generally able to cope with various kinds of recognition target data. On the other hand, a model learned by using a learning data set formed by limited data can cope with only little variations of recognition target data. However, this model can recognize recognition target data having conditions contained in the learning data set by performance higher than that of a model learned by using various kinds of data. Therefore, if a plurality of models obtained by different learning data sets exist, it is desirable to select a model matching the attribute of recognition target data as much as possible and learned by using a learning data set formed by limited data.

CITATION LIST

Patent Literature

PTL 1: Japanese Patent No. 6474946

Unfortunately, the technique described in PTL 1 can select only a model having similar imaging conditions. This poses a problem that it is difficult to select, from a plurality of models, a model learned by using data corresponding to the attribute of a recognition target and having a high recognition performance with respect to the recognition target.

The present invention has been made in consideration of the above problem, and provides a technique for selecting, from a plurality of models, a model having learned by using data corresponding to an attribute of a recognition target and having a high recognition performance with respect to the recognition target.

SUMMARY OF THE INVENTION

According to one aspect of the present invention, there is provided an information processing apparatus comprising: a first acquiring unit configured to acquire information about learning data used in learning of each of a plurality of prelearned models for recognizing input data; a second acquiring unit configured to acquire information indicating an attribute of recognition target data; and a model selecting unit configured to select a model to be used in recognition of the recognition target data from the plurality of models, based on a degree of matching between the attribute of the recognition target data and an attribute of the learning data used in learning of each of the plurality of models, and on diversity of the attribute of the learning data used in learning of each of the plurality of models.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a view for explaining learning data and a learned model according to the first embodiment;

FIG. 4 is a flowchart showing the procedure of processing to be performed by the information processing apparatus according to the first embodiment;

FIG. 5 is a view showing a user interface for setting an attribute of recognition target data according to the first embodiment;

FIG. 7 is a view for explaining a model selection process according to the first embodiment;

FIG. 8 is a view for explaining a learning data set and recognition target data according to the third embodiment;

FIG. 10 is a view showing an example of the use form of an information processing apparatus according to the fourth embodiment;

FIG. 11 is a block diagram showing an example of the functional configuration of an information processing apparatus according to the fifth embodiment;

FIG. 12 is a view showing a user interface for inputting user evaluation according to the fifth embodiment; and FIG. 13 is a view showing a user interface for setting an attribute of recognition target data according to the sixth embodiment.

DESCRIPTION OF THE EMBODIMENTS

Figure 1:
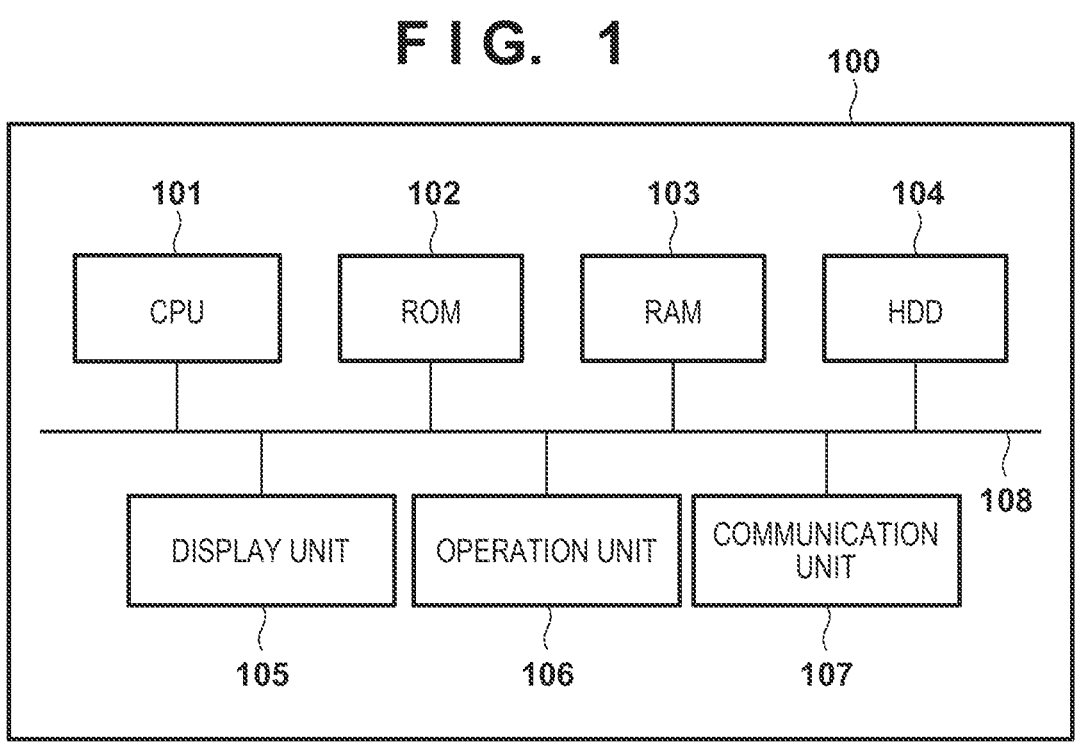
FIG. 1 is a view showing an example of the hardware configuration of an information processing apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

It is originally favorable to recognize recognition target data by using a model having learned by using a learning data set having attributes completely matching the attributes of the recognition target data. If a learned model like this exists, the model need only be selected as a model suited to recognition. If the types of attributes are various, however, it becomes difficult to prepare models having learned by using learning data sets having attribute patterns corresponding to all combinations. For example, in a case of setting 10 types of attributes with respect to data, data sets of 1,023 patterns are formed if the data sets are formed by combinations of "including" and "not including" for each attribute. In this case, learning must be performed 1,023 times if a model is learned for each data set. If the number of attribute types is increased by subdividing the data conditions, the number of models to be learned further increases. Since learning generally requires an enormous calculation time, it is difficult to form learned models of all attribute patterns.

In reality, therefore, it is possible to prepare models having attribute patterns of only some combinations of all attribute pattern combinations. This makes it difficult to always select a model having an attribute pattern completely matching that of recognition target data.

On the other hand, when recognition target data is recognized by using a model that has not learned attributes contained in the recognition target data, it is sometimes impossible to sufficiently recognize the recognition target data. This makes it necessary to select a model having learned the attributes of recognition target data, but a method of simply and reliably selecting a model having learned the attributes of recognition target data is to select a model having learned all attributes. If the attributes of recognition target data are limited, however, the recognition performance with respect to the recognition target data becomes higher when selecting a model that contains the attributes of the recognition target data but has learned data having extra attributes as little as possible, than when selecting a model having learned all attributes.

In the first embodiment, the method of selecting a model that contains the attributes of recognition target data but has learned data having extra attributes as little as possible will be explained by taking, as examples, learning of a defect recognition model in the inspection of an infrastructure, and model selection suited to a structure image of a recognition target.

First, the inspection of an infrastructure will be explained. In the inspection of the wall surface of an infrastructure, the inspector records defect such as a crack of a concrete wall surface. In inspection using an image, the inspector captures images of the wall surface of a structure, and records the positions and ranges of defects from the captured images, thereby forming inspection results. The formed inspection results are managed together with the images in association with the drawings of the structure. In this case, the work of finding and recording all defects from the images is a very hard work. Recently, therefore, it is tried to increase the efficiency of image inspection by learning a recognition model for recognizing defects of concrete wall surface images by machine learning.

In this embodiment, a recognition model for recognizing a defect is an image recognition model for recognizing a crack from a concrete wall surface image. Note that a defect recognition model for infrastructure inspection is not limited to a crack recognition model and may also be a model for recognizing another defect. For example, the model can be a recognition model for recognizing a water leakage region, a flaked region, or a rust fluid region, and can also be a model for determining the degree of deterioration of a given concrete wall surface region by machine learning.

In this embodiment, data has the following contents as will be described in detail later. First, a model for recognizing a crack is learned by using learning data containing a concrete wall surface image including a crack and training data indicating a correct crack position in the image. Also, one example of data attributes in this embodiment is the type of infrastructure such as a bridge or a tunnel. A model having learned this attribute by using images of all types of structures is a model applicable to any structure type. If it is known that a recognition target image is a bridge, however, highly accurate results can be obtained by using a model having learned by using only bridge images (only data for which the attribute of a structure type is "bridge").

The attributes of this embodiment will further be explained with reference to FIG. 5. The attributes indicate the conditions of data contained in a learning data set or in recognition target data. The attribute includes various items, and each item will be called an attribute item hereinafter. An example of the attribute item is the structure type of an infrastructure. Examples of the structure type are "bridge", "tunnel", and "dam". That is, one example of the attribute item is the type of recognition target indicated by data. Another example of the attribute item is the wall surface state of an infrastructure. FIG. 5 shows "many cracks" and "much rust fluid" as examples of the wall surface state. That is, the attribute item can include the appearance of image data and the pattern of wall surface deterioration. FIG. 5 further shows a camera parameter as an example of the attribute item based on the imaging conditions. As examples of the camera parameter, FIG. 5 shows "EV−2 or less" and "EV+2 or more" as exposure parameters. The imaging conditions can contain not only imaging parameters as described above but also information such as the camera type and the weather and the season when imaging was performed. That is, the attributes of this embodiment can contain all items for classifying data. FIG. 5 shows only the abovementioned attribute items for the sake of convenience, but it is also possible to add more attribute items and subdivide the contents of the attribute item. Note that the other contents of FIG. 5 will be explained later.

The configuration of an information processing apparatus 100 according to this embodiment will be explained below with reference to FIGS. 1 and 2.

<Hardware Configuration of Information Processing Apparatus>

FIG. 1 is a view showing the hardware configuration of the information processing apparatus 100 according to this embodiment. As shown in FIG. 1, the information processing apparatus 100 includes a CPU 101, a ROM 102, a RAM 103, an HDD 104, a display unit 105, an operation unit 106, and a communication unit 107. The CPU 101 is a central processing unit, performs arithmetic operations, logical determination, and the like for various processes, and controls constituent elements connected to a system bus 108.

The ROM (Read-Only Memory) 102 is a program memory and stores programs, including procedures to be described later, for control by the CPU 101. The RAM (Random Access Memory) 103 is used as a temporary storage area such as a main memory of the CPU 101, a work area, and the like. Note that the program memory may also be implemented by loading a program into the RAM 103 from an external storage device connected to the information processing apparatus 100.

The HDD 104 is a hard disk for storing electronic data and programs according to this embodiment. It is also possible to use an external storage device as a device for playing a similar role. This external storage device can be implemented by a medium (recording medium) and an external storage drive for accessing the medium. Known examples of the medium like this are a flexible disk (FD), a CD-ROM, a DVD, a USB memory, an MO, and a flash memory. The external storage device may also be a server apparatus connected across a network.

The display unit 105 is, for example, a CRT display or a liquid crystal display, and is a device for outputting an image to the display screen. Note that the display unit 105 may also be an external device connected to the information processing apparatus 100 by either wired or wireless connection. The operation unit 106 includes a keyboard, a mouse, and the like, and accepts various operations from the user. The communication unit 107 performs wired or wireless bidirectional communication with, for example, another information processing apparatus, a communication apparatus, and an external storage device by using a known communication technique.

<Functional Configuration of Information Processing Apparatus>

Figure 2:
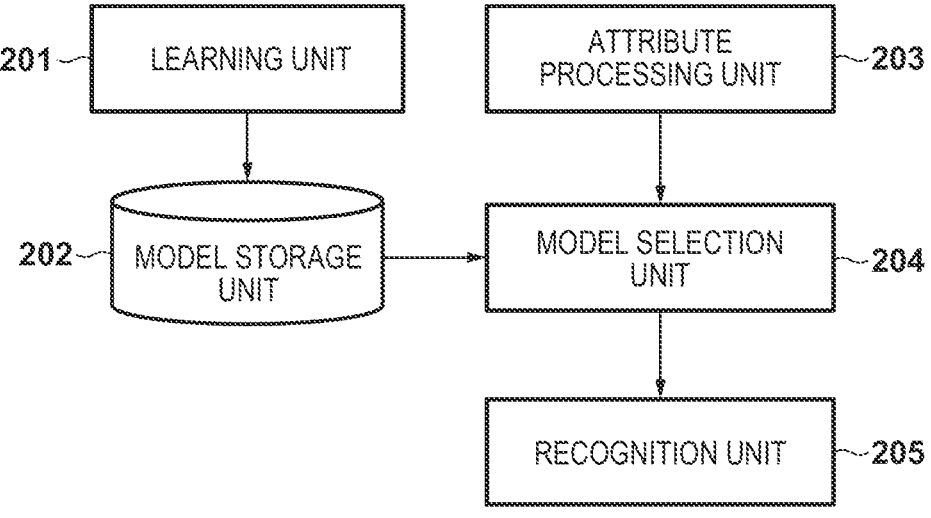
FIG. 2 is a block diagram showing an example of the functional configuration of the information processing apparatus according to the first embodiment.

FIG. 2 is an example of a block diagram showing the functional configuration of the information processing apparatus 100 according to this embodiment. The information processing apparatus 100 includes a learning unit 201, a model storage unit 202, an attribute processing unit 203, a model selection unit 204, and a recognition unit 205. These functional units are implemented by the CPU 101 by loading a program stored in the ROM 102 into the RAM 103, and executing processing complying with each flowchart (to be described later). The CPU 101 holds the execution result of each process in the RAM 103 or the HDD 104. For example, when configuring hardware instead of software processing using the CPU 101, it is only necessary to form an arithmetic unit or a circuit corresponding to the processing of each functional unit to be explained here.

An outline of each functional unit shown in FIG. 2 will be explained below. The learning unit 201 learns a plurality of models. The model storage unit 202 stores a plurality of learned models in a recording device such as the HDD 104. The attribute processing unit 203 processes attribute information of recognition target data, and transfers the processed information to the model selection unit 204. The model selection unit 204 receives the attribute information of the recognition target data from the attribute processing unit 203, and acquires information about a learned model from the model storage unit 202. From these pieces of information, the model selection unit 204 selects a model suited to recognition of the recognition target data. The recognition unit 205 performs a recognition process on the recognition target data by using the model selected by the model selection unit 204. Note that not all functional units need to be included in the information processing apparatus 100, and at least some functions can be implemented by external devices connectable to the information processing apparatus

100. For example, the functions of the learning unit 201 and the recognition unit 205 can be implemented by external devices, and the model storage unit 202 can be installed in an external device. It is also possible to exchange necessary information by appropriately communicating with external devices so as to minimize the processing of the information processing apparatus 100.

In this embodiment, the learning unit 201 learns a plurality of models in advance and stores them in the model storage unit 202. The learning of the plurality of models and the attributes of a learning data set of each model will be explained below.

First, in this embodiment as described earlier, learning data for learning a model that recognizes a crack in an image contains a pair of an image of a concrete wall surface and training data indicating a crack position in the image. A learning data set is obtained by collecting a large number of pairs of images and training data. A model is learned by using a learning data set. In this embodiment, model learning can be performed by using any machine learning algorithm, for example, an algorithm such as a neural network.

In this embodiment, learning data having various conditions are prepared to recognize images of various infrastructures and various imaging conditions. In the following explanation, all prepared learning data will be referred to as total learning data. A model learned by using this total learning data as a learning data set is a robust model usable under various conditions.

On the other hand, to form a model specialized for a limited condition, learning data for the limited condition is extracted from the total learning data, and a learning data set as a subset of the total learning data is formed. A model having learned by using this learning data set as a subset can achieve a high-performance result under the limited condition compared to a model having learned by the total learning data. Also, the attribute set of the learning data set is recorded in association with the learned model.

Model learning to be performed by the learning unit 201 according to this embodiment and the attribute set of a learning data set will be explained below with reference to FIG. 3. FIG. 3 shows the way learning data sets D1 to D3 are formed as subsets of the total learning data, and models M1 to M3 are formed by performing learning by using each learning data set.

A balloon 300 indicates data contained in the total learning data, and includes a large number of learning data each including a pair of an image 310 of a concrete wall surface and training data 311 indicating a crack position in the image 310. Also, information 312 indicating the attributes of each learning data is associated with the learning data.

A balloon 301 indicates examples of information indicating the attributes of given learning data. The balloon 301 includes, for example, "bridge" as an attribute item, and shows information indicating whether a learning data image is an image of a bridge. In this embodiment, the attribute item is set by two values, that is, True and False. In the example of the balloon 301, the learning data image is a bridge image, so True is set in an attribute item "bridge".

A learning data set is formed by extracting learning data of a predetermined condition from the total learning data, for the purpose of forming learning data of a model suitable for the predetermined condition. For this purpose, an attribute indicating the predetermined condition is set, and a learning data set is formed by collecting learning data matching the attribute from the total learning data. For example, to form a recognition model suited to a bridge, a learning data set can be formed by extracting only bridge images from the total learning data. A learning data set can also be formed by further narrowing down the condition and extracting images of bridges and wall surfaces having many cracks. By contrast, it is also possible to form a learning data set including learning data of bridges and tunnels, thereby forming a learning data set for learning a relatively robust model. As the learning data set formation methods as described above, a human can manually distribute and form learning data. It is also possible to automatically form a learning data set containing combinations of various attributes based on information of attributes associated with each learning data.

Then, the attributes of learning data forming the learning data set as a subset of the total learning data are added up. A balloon 302 in FIG. 3 indicates the results of the addition of the attributes of the learning data contained in the learning data set D3. The learning data set D3 includes not only learning data of bridge images but also learning data of tunnel images. For the attributes in the balloon 302, therefore, True is set in attribute items "bridge" and "tunnel". Information obtained by adding up the attributes of data for learning included in the learning data set and recording True or False of each attribute item as described above will be called an attribute set hereinafter. As described above, learning data contains a plurality of data for learning, and the attribute of the learning data is determined based on the results of the addition of the attributes of the plurality of data for learning.

As the learning data set formation method, it is also possible to form a plurality of learning data sets at random from the total learning data, and collect the attributes of learning data included in each learning data set, thereby forming an attribute set of the learning data set.

As described above, an attribute set of each leaning data set is formed in accordance with the attributes of learning data contained in the learning data set. Information of the attribute set is stored in the model storage unit 202 together with a model learned by using each learning data set. This enables the model selection unit 204 (to be described later) to refer to the contents of the learning data set having learned a model by calling up the attribute set together with the model.

Note that in the abovementioned explanation of the total learning data, an example in which information indicating an attribute is associated in one-to-one correspondence with each learning data has been explained. However, the present invention is not limited to this, and it is also possible to collectively prepare information indicating attributes in the total learning data with respect to a plurality of learning data. For example, information in which True is set in an attribute item "bridge" can be given to a plurality of learning data containing images of bridge wall surfaces at once.

In the embodiment explained above, attribute information is given to each learning data in the total learning data in advance, and an attribute set of a learning data set is formed by adding up the attributes of learning data contained in the learning data set.

However, the method of forming the attribute set of a learning data set is not limited to this, and another method can also be used. For example, the attribute set of a given learning data set can also be formed by checking image data and attribute information of learning data contained in the learning data set by a human, and setting True or False of each attribute of the learning data set by the human. Furthermore, when a learning data set contains only a small amount of learning data having a given attribute, it is possible to determine that the learning effect of the attribute is small, and set False for the attribute even if the learning data set includes the attribute. Assume that a learning data set is formed by mainly collecting tunnel images in order to learn a model for recognizing a tunnel image, and this learning data set contains learning data of several bridge images. In a case like this, it is possible to set True as the attribute of tunnels and False as the attribute of bridges.

As described above, the model storage unit 202 stores a learned model and the attribute set of a learning data set having learned the model. To simplify the explanation, the attribute of a learning data set having learned a model will be called the attribute set of a model in some cases hereinafter.

<Processing>

The procedure of overall processing to be performed by the information processing apparatus 100 according to this embodiment will be explained below with reference to a flowchart shown in FIG. 4.

[S401]

In step S401, the attribute processing unit 203 forms information of the attribute set of recognition target data. Before detailed explanation of step S401, recognition target data of this embodiment will be explained first.

Recognition target data of this embodiment is an image of a specific infrastructure as an inspection target. As an inspection image for an infrastructure, an image having a very high resolution is captured in order to inspect a defect such as a crack of a concrete wall surface. Accordingly, many images must be captured in order to record all the wall surfaces of an infrastructure in the form of images. That is, to inspect a given infrastructure, a process of recognizing a crack from an image is executed on a large number of images. Thus, recognition target data of this embodiment contains a large number of images.

Since the large number of images are formed from one infrastructure, the diversity of the images is lower (smaller) than that of images of all infrastructures. To inspect a given infrastructure, a recognition process is performed on these images having the limited condition, so a good recognition performance result is obtained when a model matching the recognition target data is selected.

To select a model matching the recognition target data, the attribute processing unit 203 executes a process of forming an attribute set of the recognition target data in step S401. Like the attribute set of a learning data set, the attribute set of the recognition target data is information in which True or False is set for each attribute item.

An example of a method of setting an attribute set for the recognition target data is a method in which a human checks the contents of the recognition target data and inputs information of each attribute. FIG. 5 described above shows an example of a user interface for setting the recognition target data. As will be described later, the model selection unit 204 selects a model based on the contents of the attribute set of the recognition target data and the attribute set of a learning data set. Accordingly, the recognition target data has the same attribute items as those of the learning data set. More specifically, the items of the attribute set in the balloon 302 of FIG. 3 are the same as the items of the attribute set shown in FIG. 5.

As described above, the recognition target data is formed by a plurality of images. Therefore, the recognition target data contains images having various attributes. For example, the attribute of a structure type is as follows. When the recognition target data is an image of a bridge, True is set in the attribute item "bridge", and False is set in the attributes of other structure types.

The attribute of the recognition target data will be explained below by taking the attribute item of a camera parameter as an example. Assume that when imaging the wall surface of a structure, many structural portions are imaged by exposure EV0. However, if a dark portion such as a shadow portion of a structure partially exists, only that portion is imaged by exposure EV+2 in some cases. By contrast, a wall surface irradiated with intense sunlight is sometimes imaged by exposure EV−2 by narrowing exposure. As the attribute of recognition target data formed by images captured as described above, True is set in the attribute items of both exposure EV−2 and exposure EV+2.

A user interface for the method of setting the attribute of the recognition target data will be explained below. The user is a person who operates the information processing apparatus 100 of this embodiment, and is a person who wants to execute the process of selecting a learned model suited to recognition target data. Also, the attribute processing unit 203 executes processing related to the following user interface. The attribute processing unit 203 executes, for example, a process of displaying GUI information on the display unit 105, an accepting process of accepting information set by the user via the operation unit 106, and a recording process of recording the set information in a recording area.

In the user interface shown in FIG. 5, the user checks the contents of recognition target data and sets each attribute. This user interface shown in FIG. 5 shows an example of a GUI for setting True and False by a radio button for each attribute item. Note that the method of implementing the user interface is not limited to this, and another interface can also be used. For example, an attribute can also be set by an interface that sets the contents of attributes by using a pulldown menu. In the example shown in FIG. 5, the structure of the recognition target data is a bridge. Therefore, FIG. 5 shows a state in which a mouse cursor 501 is used to set True for "bridge" and False for "tunnel". The user performs an operation of setting other attribute items from the state shown in FIG. 5.

An initial value can also be set as the attribute of recognition target data. Referring to FIG. 5, Void is set as an attribute not set by the user. Void indicates that the attribute is unknown. When the user cannot determine a given attribute of recognition target data and inputs nothing for the attribute, Void is set as an initial value. When attribute setting includes Void, an attribute item for which Void is set is not used in model selection in processing by the model selection unit 204 (to be described later). An example in which Void is set as an initial value of an attribute has been explained above, but it is also possible to set False, instead of Void, as an initial value.

When each attribute is set as described above, information indicating whether each attribute of recognition target data is True or False is formed. This information is used as the attribute set of the recognition target data. Note that when using information of Void as well, a pattern in which the attribute is Void can also be included.

The embodiment in which the user checks the contents of recognition target data and inputs an attribute of the recognition target data has been explained above, but the present invention is not limited to this. For example, it is also possible to automatically determine and set an attribute of recognition target data. In this embodiment, the attribute processing unit 203 performs a process of determining the contents of recognition target data, and sets an attribute of the recognition target data. In the determination of the contents of the recognition target data, a process of determining the contents of each attribute item is performed. For example, attribute items for camera parameters are processed as follows. That is, camera parameters such as exposure setting and ISO sensitivity are acquired by reading imaging information attached to images of recognition target data. Based on the acquired camera parameters, True or False is set for each attribute item related to the camera parameters. Also, when imaging position information such as the latitude and the longitude of a captured image can be acquired, the type of structure in the imaging position can be determined based on the position information and a database of structures. An attribute item that cannot be determined by information attached to an image can be processed as follows. That is, an image discriminator for determining each attribute is prepared, and True or False of an attribute is set based on the discrimination result of this image discriminator. For example, an image discriminator having learned so as to discriminate between an image containing many cracks and an image containing a few cracks can be used to determine whether recognition target data contains an image having many cracks, and set an attribute related to the amount of cracks. Also, it is unnecessary to automatically determine all attributes. That is, it is possible to set an attribute determination result for an attribute that can be determined automatically, and request the user to input an attribute that cannot be determined automatically.

As described above, information of an attribute set of recognition target data is formed by the processing of the attribute processing unit 203.

[S402]

Then, in step S402, the model selection unit 204 selects a model suitable for the recognition target data from a plurality of models, based on the attribute set of the learning data set and the attribute set of the recognition target data. More specifically, the model selection unit 204 selects a model by gradually determining the degree of matching between the attribute set of the learning data set and the attribute set of the recognition target data, and the diversity of the learning data set.

FIG. 7 is a view showing examples of the attribute set of the recognition target data and the attribute sets of a plurality of (n) models. FIG. 7 represents True and False of an attribute by O and X for the sake of convenience. Models M1 to M4 shown in FIG. 7 are models having learned by using a leaning data set as a subset of the total learning data, and are models having learned by using learning data including limited attributes. For example, when focusing attention on the attribute of a structure type, the models M1 to M3 are models having learned by using learning data of bridge images, and the model M4 is a model having learned by using learning data of tunnel images. Also, a model Mn is a model having learned by using the total learning data, and is a model in which all attribute items are True.

Figure 6:
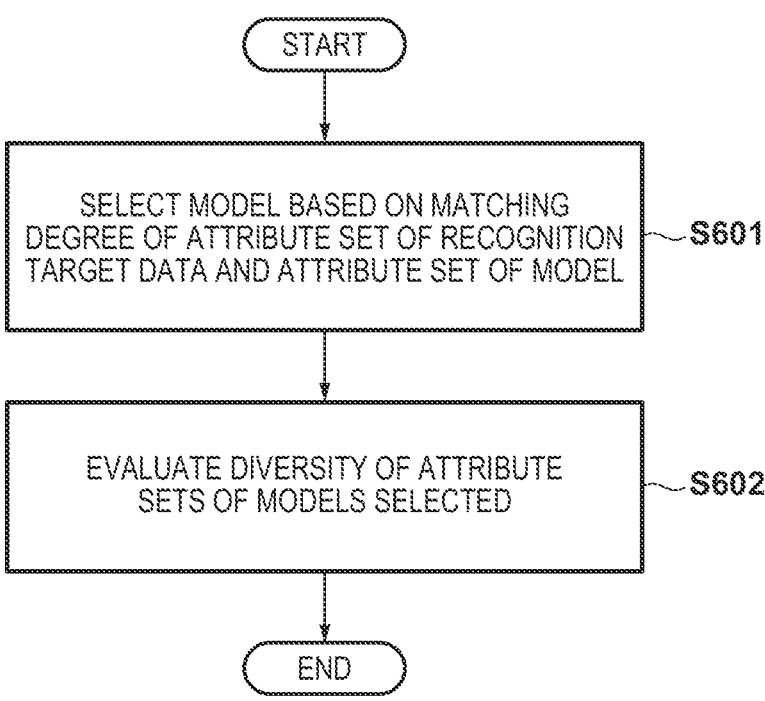
FIG. 6 is a flowchart showing the procedure of processing to be performed by a model selection unit according to the first embodiment.

The processing of the model selection unit 204 will be explained in detail below with reference to a flowchart shown in FIG. 6 and FIG. 7. The flowchart of FIG. 6 shows the detailed procedure of the processing in step S402 performed by the model selection unit 204.

In step S601, the model selection unit 204 determines the matching degree between the attribute set of the learning data set and the attribute set of the recognition target data. In this embodiment, the matching degree between the attribute sets is determined by checking the inclusion relation between the attribute set of the recognition target data and the attribute set of the learning data set. More specifically, by focusing attention on an attribute item for which True is set in the recognition target data, a model in which True is set for the same attribute item is selected. In the example shown in FIG. 7, True is set for "bridge", "many cracks", and "EV-2 or less" of the attribute items of the recognition target data.

A model in which True is set for these three types of attribute items and which has a completely matched attribute set is originally a model most suited to the recognition target data. In step S601, the model selection unit 204 checks whether a model having a completely matched attribute set exists. If a model having a completely matched attribute set exists, the model selection unit 204 selects the model. If a model having a completely matched attribute set exists, a process of determining the diversity in step S602 is unnecessary. Therefore, the processing can be terminated by skipping step S602.

As described previously, however, it is difficult to learn a plurality of models including patterns of all attribute sets, so there is a case in which an optimal model is selected from models having incompletely matched attribute sets. In the example shown in FIG. 7, a model having an attribute set completely matching the attribute set of the recognition target data does not exist.

In a situation like this, the model selection unit 204 selects a model including the attributes of the recognition target data in step S601. More specifically, the model selection unit 204 selects a model in which True is set for the attribute items "bridge", "many cracks", and "EV-2 or less" in the same manner as in the recognition target data. This is so because in order to cope with the attributes of the recognition target data, it is necessary to select a model having learned the conditions of these attributes. Based on this criterion, three models, that is, the models M2, M3, and Mn are selected in the example shown in FIG. 7. If a plurality of models are thus selected in step S601, the models are further limited by the processing in step S602.

In step S602, the model selection unit 204 selects a model based on the diversity of the attribute sets of the models selected in step S601. To execute recognition with a high performance, it is desirable to select a model having learned without including any extra learning data with respect to the attributes of the recognition target data. In step S602, therefore, a model having learned by using learning data having a low (small) attribute diversity is selected from the models selected in step S601, thereby selecting a model including the attributes of the recognition target data and not having performed any extra learning. The diversity of a model is calculated by counting the number of attributes of a learning data set having learned the model. More specifically, the number of attributes for which True is set in the learning data set of each model is calculated as the diversity. In the example shown in FIG. 7, the diversities of the models selected in step S601 are 4 for the model M2, 5 for the model M3, and 7 for the model Mn. In this model selection based on the diversity in step S602, a model having the smallest diversity value is selected from the models selected in step S601. Accordingly, the model M2 is selected in the example shown in FIG. 7.

Details of the process of selecting a model suitable for recognition of the recognition target data has been explained in accordance with the flowchart of FIG. 6. Note that if a model including the attributes of the recognition target data does not exist in step S601, a model having a highest attribute matching degree (a model including most attributes of the recognition target data) is selected. In this case, it is also possible to previously set an attribute item that must be matched. For example, the structure type is an important attribute item in model selection. Therefore, it is also possible to select models in which the attribute setting of at least the structure type matches, and select a model in which other attribute items best match from the models selected based on the structure type.

As described earlier. Void can be set as information indicating that an attribute is unknown, for the attributes of the recognition target data. In this case, the model selection unit 204 can execute the processing by ignoring an attribute for which Void is set in the attribute item of the recognition target data. More specifically, in the process of determining the matching degree between the attributes of the recognition target data and the attributes of the model, it is only necessary to prevent an attribute item for which Void is set in the attribute set of the recognition target data from having influence on the matching degree of the model, regardless of whether the attribute item of the model is True or False.

As explained above, the processing of the model selection unit 204 selects a model suited to recognition of the recognition target data.

[S403]

In step S403, the recognition unit 205 executes a recognition process by using the model selected in step S402, and forms a recognition result with respect to a recognition target image. In this embodiment, the recognition unit 205 recognizes a crack in the recognition target image, and forms a recognition result indicating the crack position in the image. The series of processes shown in FIG. 4 are thus completed.

As has been explained above, this embodiment acquires information about learning data used in learning of each of a plurality of prelearned models to be used to recognize input data, and information indicating the attributes of the recognition target data. Then, based on the matching degree between the attributes of the recognition target data and the attributes of the learning data used in learning of each of the plurality of models, and on the diversity of the attributes of the learning data used in learning of each of the plurality of models, a model to be used to recognize the recognition target data is selected from the plurality of models. That is, a model selected in this embodiment is a model including the attributes of the recognition target data and not having learned any extra attributes. Accordingly, a model having learned by using data corresponding to the attributes of recognition target data and having a high recognition performance with respect to a recognition target can be selected from a plurality of models, so it can be expected to obtain a favorable recognition result.

Second Embodiment

In the first embodiment, an example in which one model suitable for recognition of recognition target data is selected has been explained. However, model selection is not limited to the selection of one model, and it is also possible to select a plurality of models based on the diversity. In the second embodiment, an example in which a plurality of models suited to recognition of recognition target data are selected will be explained.

Note that the hardware configuration and the functional configuration of an information processing apparatus 100 according to the second embodiment are the same as those of the first embodiment, so an explanation thereof will be omitted. Also, like the first embodiment, an embodiment using a crack recognition model for inspecting an infrastructure will be explained in the second embodiment as well. The procedures of processing according to the second embodiment comply with the flowcharts shown in FIGS. 4 and 6.

A model selected in the first embodiment is a model including the attributes of recognition target data and not having learned any extra attributes, so it can be expected to recognize the recognition target data with high performance. To obtain this effect, it is necessary to correctly set the attributes of recognition target data. However, when the number of image data in recognition target data is very large, it is sometimes difficult to correctly determine all attributes of the recognition target data. Especially when the user sets the attributes of recognition target data, it is difficult to check all recognition target images, and this may make it impossible to correctly set an attribute pertaining to an image appearance such as a wall surface state.

In order to cope with a situation like this, the second embodiment selects a model having high (large) diversity of an attribute set and capable of performing robust recognition, in addition to the model selected in the first embodiment. More specifically, in step S602 explained in the first embodiment, a model having a smallest diversity is selected as a first model in the same manner as in the first embodiment. Then, a model having a relatively high diversity value is selected as a second model for performing robust recognition. More specifically, a model in which the number of Trues set in attribute items is larger than that of Trues in the attribute items of the first model is selected as the second model. That is, a model having learned by using learning data having large diversity is selected. Accordingly, even when the setting of attributes of recognition target data has a mistake, a relatively robust model is also selected as the second model. Therefore, even when the recognition target data has higher diversity than expected, a model that can cope with the recognition target data is selected.

If a model having a largest diversity is selected when a model having learned by using the total learning data exists, a model having learned by using the total learning model is always selected. Although this is also one embodiment, a model having diversity larger by a preset predetermined value than the diversity of the first model may also be selected. This makes it possible to select a model including the attributes of recognition target data and having a slightly high robusticity. This model shows performance intermediate between the model of the total learning data and the first model. Although the model is inferior to the model of the total learning data in robusticity, the model is suited to recognition of recognition target data because the amount of extra learning data is relatively small.

As described previously, there is the possibility that the attributes of recognition target data about a wall surface state are not correctly set. Therefore, a model that is robust for attributes related to the wall surface state can be selected as the second model. Accordingly, it is also possible to select a model in which the number of Trues set in attribute items related to the wall surface state is larger by a predetermined number than that set for the attributes of the first model. As described above, even when setting the second model based on the diversity, the second model can be selected by limiting attributes for evaluating the diversity.

By the processing described above, it is possible to select the first model that is regarded as optimum for a recognition target and the second model that is relatively robust, based on the attribute set of recognition target data.

After that, in step S403 explained in the first embodiment, a recognition unit 205 forms a recognition result of each of the two selected models, and presents the user with the both results. The user checks the two recognition results, and adopts a presumably more appropriate recognition result.

For this processing, the recognition unit 205 performs a process of displaying the recognition results on a display unit 105, and a process of accepting the selection of a recognition result by the user via an operation unit 106. The presentation of the two recognition results is performed such that the recognition results of the individual models can be compared. More specifically, images are formed by superposing the crack recognition results of the individual models on a recognition target image, and the formed images are displayed side by side or one at a time.

It is also possible to cause the display unit 105 to display information of the two models selected by a model selection unit 204 before the recognition unit 205 executes the recognition process, thereby allowing the user to determine a model to be used in the recognition process. The information of the model to be displayed here is, for example, information of the attribute set of each model. Furthermore, to make the comparison of the information of the attribute sets of the models easier, it is possible to display the information side by side or highlight an attribute item having a difference. By allowing the user to select a model in advance, the number of models on which the recognition unit 205 performs the recognition process can be reduced, so the time of the recognition process can be reduced as well.

Note that in this embodiment, an example in which two models are selected has been explained. However, the number of models to be selected is not limited to two, and three or more models can also be selected based on the diversity. In this case, a plurality of second models are selected based on the diversity. More specifically, it is possible to select a model having diversity slightly higher than that of the first model, and select a model having an even higher diversity. This makes it possible to select a plurality of models different in robusticity.

Third Embodiment

In each of the above embodiments, an attribute is a clear item such as a structure type which a human can visually understand. However, the present invention is not limited to this. In the third embodiment, an example in which information of an attribute is formed based on an image feature amount will be explained. Note that the hardware configuration and the functional configuration of an information processing apparatus 100 according to the third embodiment are the same as those of the first embodiment, so an explanation thereof will be omitted. Also, like the first embodiment, an embodiment using a crack recognition model for inspecting an infrastructure will be explained in the third embodiment as well.

In the third embodiment, information of an attribute set is formed from images of a learning data set or images of recognition target data by a method called Bag-of-Features or Bag-of-Visual Words. Since Bag-of-Features is a well-known method, a detailed explanation of the algorithm itself will be omitted. An embodiment in which an attribute set is formed by Bag-of-Features will be explained below with reference to FIG. 8.

FIG. 8 shows learning data sets 801 to 80$n$. A process of forming information of an attribute set 841 from the learning data set 801 of these learning data sets will be explained. To explain this process, Visual word in this embodiment will be explained first. Visual word is formed by clustering image features of images of the total learning data, and setting the center of each cluster as Visual word. An image feature can be a local feature amount such as SIFT or SURF often used in the conventional Bag-of-Features, and an image feature extracted by using Convolutional Neural Network (CNN) can also be used. SIFT stands for Scale Invariant Feature Transform, and SURF stands for Speeded Up Robust Features.

Then, a histogram 831 is formed based on images contained in the learning data set 801 and on Visual word. "bin" of the histogram 831 indicates the index of Visual word. For the sake of convenience, FIG. 8 illustrates a case in which the number of types of Visual word is four. However, the number of types of Visual word is normally much larger. To form the histogram 831, image features of images contained in the learning data set 801 are extracted, and vote is performed for Visual word having a most similar image feature. Referring to FIG. 8, an arrow 822 indicates the way an image 821 votes for index 1 because the image feature of the image 821 is similar to Visual word of index 1. In normal Bag-of-Feature, a histogram feature is formed from one image. However, the object of this embodiment is to form information indicating the tendency of a learning data set. Therefore, image features are extracted from all images in the learning data set 801, and vote is performed for histograms.

FIG. 8 illustrates the way one vote 822 is performed from one image 821, and this is so because the image 821 is an image having a local patch size. When the size of a learning image is large, it is also possible to extract partial image features from one image, and perform vote for a histogram based on each image feature.

A histogram 831 of Visual word is formed by the above processing. This histogram indicates the tendency of an image feature of the learning data set 801. That is, in this embodiment, the data condition of a learning data set is expressed based on an image feature by using each Visual word as an attribute item.

Then, as in the first embodiment, threshold processing is performed on the histogram 831 in order to form an attribute set in which binary information True or False is set in each item. FIG. 8 shows an attribute set 841 formed as a result of threshold processing performed on the histogram 831 by using a threshold 832. In the attribute set 841, only index 1 having a value larger than the threshold 832 is True. Note that it is also possible to form an attribute set in which Visual word index for which vote is performed at least once is set to True, without performing the threshold processing as described above. However, it is possible to correctly form an attribute set for indicating the tendency of a learning data set, when threshold processing is performed by regarding a small amount of voting results as noise.

Attribute sets of learning data sets are formed by performing the above processing on each learning data set. As in the first embodiment, information of these attribute sets is stored in a model storage unit 202 together with models having learned by using the learning data sets.

An attribute set based on an image feature is formed for recognition target data as well by using the same method. FIG. 8 shows an image group 810 of the recognition target data. From this image group, a histogram 833 is formed by using the same Visual word as that used when forming the histogram from the learning data set, and information of an attribute set 851 is obtained.

Attribute sets 841 to 84*n* of the learning data sets and the attribute set 851 of the recognition target data are obtained by the above processing. A model selection method using these pieces of information can be performed in the same manner as in the first embodiment, so an explanation thereof will be omitted.

Note that Visual word is automatically formed by clustering in the above-described method, and this makes it difficult to determine an image feature indicated by each Visual word. Since Visual word is an attribute item in this embodiment, it is also difficult to determine the tendency of a learning data set or recognition target data. To clarify an attribute indicated by Visual word, therefore, Visual word for representing a specific image can also be formed manually. For example, it is possible to manually collect images having many cracks from the total learning data, and regard the feature amount distribution center of these images as one Visual word. Consequently, this Visual word clearly indicates an attribute "many cracks".

As has been explained above, this embodiment forms an attribute set based on an image. This makes it possible to select a model to be used in recognition based on the appearance and atmosphere of the image.

Note that it is also possible to use a combination of the attribute items understandable by a human used in the first embodiment and the attributes based on image features used in the third embodiment. For example, an attribute that can explicitly be input, such as a structure type or a camera parameter, can be set as an attribute item having an explicit name in the first embodiment, and an attribute based on an image, such as a wall surface state, can be formed based on an image feature. These attribute settings can also be combined to form an attribute set to be used in model selection.

Fourth Embodiment

In the second embodiment, an embodiment in which a plurality of models are selected and presented to the user and the user checks the selected models and further selects a model has been explained. In the fourth embodiment, an example in which the model selection result is thus presented to the user will be explained in more detail below.

Note that the hardware configuration and the functional configuration of an information processing apparatus 100 according to the fourth embodiment are the same as those of the first embodiment, so an explanation thereof will be omitted. Also, like the first embodiment, an embodiment using a crack recognition model for inspecting an infrastructure will be explained in the fourth embodiment as well.

Figure 9:
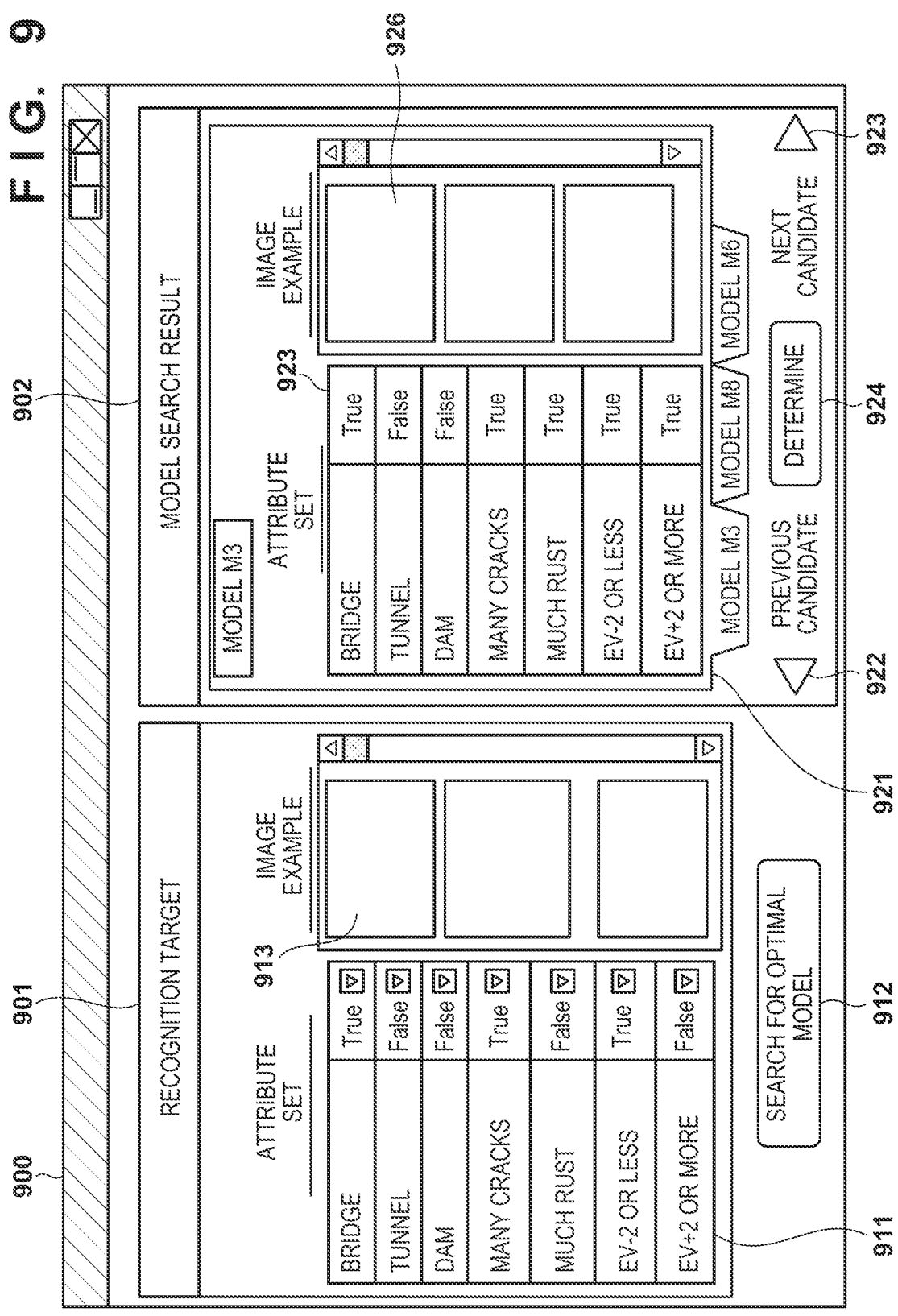
FIG. 9 is a view for explaining a user interface according to the fourth embodiment.

FIG. 9 is a view for explaining a GUI application for model selection. An application window 900 includes a region 901 showing information about recognition target data, and a region 902 showing information of a model selected by a model selection unit 204. In this embodiment, processing from a process of setting an attribute of recognition target data to a process of selecting a model will be explained from the viewpoint of a user interface. A CPU 101 functions as a display control unit, and displays the application window by controlling the display of a display unit 105.

The application window 900 has a region 911 for inputting an attribute of recognition target data. The region 911 is an interface for the same purpose and function as those shown in FIG. 5. In FIG. 9, however, the region 911 is an interface for setting True or False for each attribute item by a pulldown button. After setting the attribute items, the user presses an optimal model search button 912.

In response to this operation, the model selection unit 204 selects a model suited to the recognition target data. FIG. 9 shows an example in which three types of models M3, M8, and M6 are selected, and information of each model is displayed in its tab. Note that the order of the tabs of the models indicates the order of the diversities of the models.

FIG. 9 shows buttons 922 and 923 for showing these models by switching them. The user displays the models by switching them by using the buttons 922 and 923, and determines a model to be used in a recognition process while checking the information of each model.

FIG. 9 shows an OK button 924 for selecting the model currently being displayed as a model to be used in the recognition process. Note that the display of a plurality of models is not limited to the display like this, and it is also possible to simultaneously display a plurality of models and compare the contents of the models. In addition, the number of models to be selected is not limited to one, and a plurality of models can also be selected. When selecting a plurality of models, the recognition process is executed by using each model, the recognition results are compared, and a more appropriate recognition result is determined.

The region 902 showing model information will be explained below. The region 902 showing model information displays information 925 of an attribute set of the model. The user can compare and confirm the information 925 of the attribute set of the model and the information 911 of the attribute set of the recognition target data, and select a model having learned by more analogous conditions. Note that in order to make this comparison easier, it is also possible to highlight attribute items having the same setting in the attribute set 911 of the recognition target data and in the attribute setting 925 of the model. On the contrary, items having different settings can also be highlighted. It is also possible to display at least one of the information 925 of the attribute set of the selected model and the information 911 of the attribute set of the recognition target data.

The region 902 showing model information can further display examples of a learning image having learned the model as indicated by an image 926. By thus displaying a learning image as information of a model, the user can more intuitively understand conditions under which the model has learned.

Note that when attribute information is associated with each learning data as in the first embodiment, it is also possible to display only an image in which True is set for a predetermined attribute. This enables the user to easily understand, for example, the type of an image having an attribute "many cracks" learned by a given model.

In addition, the region 901 showing information about recognition target data can also display an image of the recognition target data. Referring to FIG. 9, the region 901 showing information about recognition target data displays an image of the recognition target data as indicated by an image 913. This image of the recognition target data is, for example, an image of a part of the structure wall surface of a recognition target. By thus displaying an image of recognition target data and an image having learned a model by comparing them, it becomes easier to select a model by which the conditions of the learning image are similar to those of the image of the recognition target data.

Furthermore, as the image 926 having learned a model, it is also possible to preselect a typical image of each attribute and display the preselected image, instead of displaying all learning images. If the user can understand the tendency of an image learned by a model, it is also possible to use not an actually learned image but a similar sample image, an illustration, or the like. This makes it possible to display an image that can easily be compared with an image of recognition target data.

The images 926 having learned the model need not be actually learned images and may also be virtually generated images. Recently, a technique called GAN (Generative Adversarial Networks) is developing a technique of generating an image based on learning. By using this technique, it is possible to learn the tendency of images in an image group of a learning data set, generate an image similar to the images of the learning data set by using the learned model, and use the generated image as a learning image to be displayed. It is also possible to display at least one of the image 926 of learning data having learned the selected model and the image 913 of the recognition target data.

As has been explained above, the user can easily select a model when an interface for selecting one or more models from a plurality of models selected by the model selection unit 204 is provided. Note that an example in which a model to be used in the recognition process is selected from a plurality of models has been explained above. However, even when the model selection unit 204 has selected only one model, the user interface according to this embodiment can be provided in order to check the selected model. In this case, the buttons 922 and 923 in FIG. 9 for displaying a plurality of models by switching them and the OK button 924 for selecting a model are unnecessary.

The CPU 101 of the information processing apparatus 100 implements the above processing by loading a program stored in a ROM 102 into a RAM 103 and executing the program. Also, the CPU 101 displays the GUI on the display unit 105 and accepts an operation from the user by an operation unit 106 as needed.

Model selection and the recognition process can also be performed in the form of SaaS (Software as a Service). FIG. 10 shows information processing apparatuses 110, 120, 121, and 122 in the form of SaaS. Like the information processing apparatus 100, each of these information processing apparatuses includes a CPU 101, a ROM 102, a RAM 103, an HDD 104, a display unit 105, an operation unit 106, and a communication unit 107. The configuration of each information processing apparatus is the same as the explanation of the information processing apparatus 100, so a detailed explanation thereof will be omitted.

In this example shown in FIG. 10, the information processing apparatus 110 is a server, and the information processing apparatuses 120, 121, and 122 are clients. The client information processing apparatuses 120, 121, and 122 receive information from the server information processing apparatus 110, and execute processing related to the user interface. More specifically, each client displays the GUI as shown in FIG. 9 explained in this embodiment, and accepts user operations. The server information processing apparatus 110 executes the functions of the model selection process and the recognition process explained in the first embodiment. Note that the number of the client information processing apparatuses is not limited to that of the example shown in FIG. 10. By thus performing services in the form of SaaS, they can be provided to many users.

Fifth Embodiment

In the fifth embodiment, an example in which model evaluation is added as a determination criterion of model selection will be explained.

FIG. 11 is an example of a block diagram showing the functional configuration of an information processing apparatus 100 of the fifth embodiment. A CPU 101 implements these functional units by expanding programs stored in a ROM 102 into a RAM 103, and executing processing complying with each flowchart. The CPU 101 holds the execution result of each process in the RAM 103 or the HDD 104. When, for example, configuring hardware instead of the software processing using the CPU 101, it is only necessary to configure arithmetic units and circuits corresponding to the processing of each functional unit to be explained here. Note that the following explanation includes an embodiment in the form of SaaS. In the form of SaaS, however, a server information processing apparatus and a client information processing apparatus execute the following processing as explained in the fourth embodiment.

The information processing apparatus 100 according to this embodiment includes a model evaluation unit 206 in addition to the functional block diagram shown in FIG. 2. The model evaluation unit 206 executes model evaluation and performs information collection. Processing to be executed by the model evaluation unit 206 will be explained below.

One embodiment of model evaluation is a method of using user evaluation on a model. As explained in the fourth embodiment, services can be provided to many users in the form of SaaS. Each user receives a recognition result using a selected model, and satisfies with the result in some cases and does not satisfy with the result in some other cases. In this embodiment, the satisfaction levels of users are collected for each model and used as evaluation of the model.

FIG. 12 is a view for explaining an interface for collecting the user satisfaction levels of each model. A client information processing apparatus presents the user with this interface shown in FIG. 12. A GUI window 1200 displays a recognition result 1201 of a recognition target image recognized by a given model. In this example shown in FIG. 12, the recognition result 1201 is a crack recognition result of a given structure wall surface image. The user sees this result and inputs the satisfaction level of the recognition result. FIG. 12 shows an input section 1202 for inputting a user satisfaction level. In this example, selection can be accepted by radio buttons for performing evaluation by three stages "good", "average", and "bad". The user inputs one of these evaluations and presses a transmit button 1203. Consequently, a model for which the recognition result is formed and the user evaluation are associated with each other and recorded in the server information processing apparatus.

The evaluation value (evaluation accuracy) of each model is determined by accumulating the user evaluations as described above. The evaluation value of a model can be obtained by simply scoring and adding up the evaluations from the users. For example, the user evaluations are accumulated for each model by setting +1 for "good", 0 for "average", and −1 for "bad". As a consequence, the evaluation value of a model having a high user satisfaction level and a high performance increases. The model evaluation unit 206 executes the collection and accumulation of the user evaluations and the calculation of the model evaluation value as described above.

In a model selection process, a model selection unit 204 acquires the evaluation value of each model from the model evaluation unit 206, and uses the model evaluation value as a criterion of model selection. That is, the model selection unit 204 selects a model based on the user evaluation for the model. For example, in step S602 of the first embodiment, the model selection unit 204 selects a model having a small diversity value and a high model evaluation value. By thus selecting a model by taking the model evaluation value into account, a proven model having a high user satisfaction level can be selected.

As another method of measuring the user satisfaction level, it is also possible to record the count at which a model is selected. As explained in the second and fourth embodiments, the model selection unit 204 can also select a plurality of models and present them to the user. In this case, the user selects a model to be used in the recognition process from the plurality of models. This count of selection is recorded for each model, and the records are added up such that the model evaluation value rises as the selection count increases.

A still another user satisfaction level measuring method is as follows. That is, in order for the user to reuse a selected model, it is also possible to register a model by bookmark and calculate the model evaluation value based on the count of registration.

An example in which the evaluation of a model based on the user satisfaction level is used in model selection has been explained above.

A method of evaluating a model by using prepared performance evaluation data will be explained below as another embodiment of the model selection method using model evaluation. In this embodiment, a large number of performance evaluation data containing a pair of an image and ground truth information indicating a crack position in the image are prepared as total performance evaluation data, like the total learning data of the first embodiment. Also, information indicating an attribute of each performance evaluation data is associated with the performance evaluation data and recorded. A recognition process is performed on the image of the performance evaluation data as described above by using a given model, and the recognition process result and the ground truth information are compared. As a consequence, the accuracy rate or precision of the model can be obtained. In an embodiment using the performance evaluation result as an evaluation value, the accuracy rate or the precision obtained as described above is used as an evaluation value.

Also, a performance evaluation data set matching the attribute set of recognition target data is formed, and a recognition process using a model is performed on this performance evaluation data set, thereby calculating the accuracy rate or the precision and calculating the evaluation value of the model. Then, performance evaluation data are collected and formed from the total performance evaluation data, such that the performance evaluation data set becomes a data set having an attribute set similar to that of the recognition target data. The process of forming an evaluation value by calculating the accuracy rate or the precision with respect to the performance evaluation data set can be performed on all models or on only limited models each having an attribute set similar to that of the recognition target data.

The evaluation value of a model calculated as described above is used in model selection. Model selection using this evaluation value can be executed in the same manner as when using the evaluation value based on user evaluation described previously.

Note that the embodiment that constructs an evaluation data set in accordance with the attribute set of recognition target data and evaluates a model has been explained above. However, it is also possible to calculate an evaluation value by evaluating a model by using an arbitrary performance evaluation data set in advance. In this case, various performance evaluation data sets having different attribute sets are formed, an evaluation value is calculated by evaluating each model by using each of these performance evaluation data set, and the performance evaluation data set and the model are recorded as they are associated with each other. In the model selection process, the attribute of recognition target data is set, and, when an attribute set of the recognition target data is obtained, an evaluation value evaluated by performance evaluation data set having an attribute set similar to that of the recognition target data is called as an evaluation value of each model. Then, the called evaluation value is used as an evaluation value of each model in model selection.

As described above, when a performance evaluation data set is constructed and a model is evaluated in advance, model evaluation need not be performed whenever the attribute of recognition target data is set, so the time required for evaluation and model selection can be omitted.

Note that if a model suitable for recognition target data cannot be selected after the process of selecting a model based on the attribute of the recognition target data, a new model can be learned. For example, if a model including an attribute set of recognition target data cannot be selected from existing learned models, a learning unit 201 executes a process of learning a new model.

The learning unit 201 forms a learning data set of a new model to be learned, based on an attribute set of recognition target data. More specifically, data of learning data sets are collected from the total learning data so as to obtain an attribute set similar to that of the recognition target data. In the process of forming a learning data set similar to the attribute set of the recognition target data, it is possible to construct at least an attribute set of a learning data set including the attribute set of the recognition target data. A new model is learned by using the learning data set formed as described above. Consequently, a model suited to the recognition target data can be formed.

Note that when learning a model in accordance with recognition target data, additional learning may also be performed based on an existing learned model in order to reduce the learning time. This additional learning is performed by using the model selected in the abovementioned embodiment as a base model. More specifically, a model suited to recognition of recognition target data is first selected from existing learned models by the processing explained in this embodiment or other embodiments. The learning time can be shortened by using this model as a base model. In addition, as a learning data set to be used in the additional learning, a learning data set having an attribute set similar to that of the recognition target data is formed as described above. Furthermore, a learning data set can also be constructed by comparing the attribute set of the model as a base model and the attribute set of the recognition target data, and collecting only learning data having attributes lacking in recognition of the recognition target data.

Sixth Embodiment

In each of the above embodiments, the explanation has been made by taking crack recognition for inspecting an infrastructure as an example of a recognition target. However, the present invention is not limited to this and can also be used in other applications. In the sixth embodiment, selection of a recognition model to be used in a fixed camera such as a monitoring camera will be explained. Note that the hardware configuration and the functional configuration of an information processing apparatus 100 according to the sixth embodiment are the same as those of the first to fifth embodiments, so an explanation thereof will be omitted.

In this embodiment, a model suited to an environment in which a fixed camera such as a monitoring camera is installed is selected from a plurality of learned models. In this case, attributes of a recognition target as explained in the first to fifth embodiments need only be changed to attributes related to recognition by the fixed camera. The same processes as those explained in the first to fifth embodiments can be performed except for attribute items. Accordingly, attributes to be used in an embodiment in which a fixed camera is a target will be explained below.

Attribute items of this embodiment will be explained with reference to FIG. 13. FIG. 13 shows a user interface for setting attributes of recognition target data for selecting a model of a fixed camera. FIG. 13 is a modification of FIG. 5 of the first embodiment. Examples of attributes in an embodiment of a fixed camera include items pertaining to a camera installation environment, a recognition target, and imaging. FIG. 13 shows an example including attribute items "shop", "station", and "road", as the camera installation environment. Main recognition targets in the camera installation environment can also be set as attribute items, and FIG. 13 shows an example including attribute items "person" and "vehicle". Note that the attribute items shown in FIG. 13 are merely examples, so the present invention is not limited to these attribute items, and other attribute items can also be included as the camera installation environment. For example, items such as "inside", "outside", and "night imaging" can also be included. Note that FIG. 13 shows a state in which the user sets True in "shop" and False in "station", and the user continuously sets attributes of the fixed camera as a model selection target with respect to other attribute items. In addition, as shown in FIG. 13, Void can also be set in an attribute item as in the first embodiment.

As described above, when setting attributes of recognition target data, the attributes are set for the fixed camera as a target of model selection. When all attribute items are completely set by this processing, an attribute set of a fixed camera image as recognition target data is formed. A process of selecting a learned model based on the attribute set of the recognition target data can be performed in the same manner as in the other embodiments. Note that for this processing, each learned model and attribute set information indicating an attribute combination of learning data with which the model has learned are saved as they are associated with each other.

As has been explained above, the information processing apparatus according to each of the above embodiments can be used in model selection of an arbitrary recognition target by changing attribute items.

According to the present invention, it is possible to select, from a plurality of models, a model learned by using data corresponding to the attribute of a recognition target and having a high recognition performance with respect to the recognition target.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
a first acquiring unit configured to acquire information about learning data used in learning of each of a plurality of prelearned models for recognizing input data;
a second acquiring unit configured to acquire information indicating an attribute set of recognition target data, the recognition target data comprising images of an infrastructure; and
a model selecting unit configured to select, from the plurality of models, as a model to be used in recognition of the recognition target data, a model having learned attribute items of an attribute set of the learning data used in learning of each of the plurality of models, which match with attribute items of the attribute set of the recognition target data for which True is set,
wherein the attribute set of the learning data and the attribute set of the recognition target data is information in which True or False is set for each attribute item, and
wherein the recognition of the recognition target data comprises the recognition of a defect of the infrastructure, and
wherein, in case several models which have learned the attribute items for which True is set are selected by the model selecting unit, the model selecting unit is configured to select from the several models as the model to be used in recognition of the recognition target data a model in which a number of attribute items for which True is set in the learning data is smallest.

2. The information processing apparatus according to claim 1, further comprising a display control unit configured to control a display unit to display at least one of an attribute item of a model selected by the model selecting unit, and an attribute item of the recognition target data.

3. The information processing apparatus according to claim 2, wherein the display control unit controls the display unit to further display at least one of an image of learning data having learned a model selected by the model selecting unit, and the images of the infrastructure.

4. The information processing apparatus according to claim 1, wherein the model selecting unit selects a model further based on a recognition accuracy of a model.

5. The information processing apparatus according to claim 1, wherein the model selecting unit selects a model further based on user evaluation with respect to a model.

6. The information processing apparatus according to claim 1, wherein the attribute item is based on an image feature of an image.

7. The information processing apparatus according to claim 1, wherein the learning data includes a plurality of data for learning, and
wherein an attribute item of the learning data is determined based on a result of addition of attribute items of the plurality of data for learning.

8. An information processing method comprising:
acquiring information about learning data used in learning of each of a plurality of prelearned models for recognizing input data;
acquiring information indicating an attribute set of recognition target data, the recognition target data comprising images of an infrastructure; and
selecting from the plurality of models as a model to be used in recognition of the recognition target data, a model having learned attribute items of an attribute set of the learning data used in learning of each of the plurality of models, which match with attribute items of the attribute set of the recognition target data for which True is set,
wherein the attribute set of the learning data and the attribute set of the recognition target data is information in which True or False is set for each attribute item, and
wherein the recognition of the recognition target data comprises the recognition of a defect of the infrastructure, and
wherein, in case several models which have learned the attribute items for which True is set are selected, a model that has a smallest number of attribute items for which True is set in the learning data is selected from the several models as the model to be used in recognition of the recognition target data.

9. A non-transitory computer readable storage medium storing a computer program for causing a computer to execute an information processing method comprising:
acquiring information about learning data used in learning of each of a plurality of prelearned models for recognizing input data;
acquiring information indicating an attribute set of recognition target data, the recognition target data comprising images of an infrastructure; and
selecting from the plurality of models as a model to be used in recognition of the recognition target data, a model having learned attribute items of an attribute set of the learning data used in learning of each of the plurality of models, which match with attribute items of the attribute set of the recognition target data for which True is set,
wherein the attribute set of the learning data and the attribute set of the recognition target data is information in which True or False is set for each attribute item, and
wherein the recognition of the recognition target data comprises the recognition of a defect of the infrastructure, and
wherein, in case several models which have learned the attribute items for which True is set are selected, a model that has a smallest number of attribute items for which True is set in the learning data is selected from the several models as the model to be used in recognition of the recognition target data.

* * * * *